US012783333B2

(12) United States Patent
Woodrow et al.

(10) Patent No.: US 12,783,333 B2
(45) Date of Patent: Nov. 3, 2026

(54) CONCENTRATE CONTROL SYSTEMS AND METHODS

(71) Applicant: HYDRATION LABS, INC., Charlestown, MA (US)

(72) Inventors: Chad Woodrow, Somerville, MA (US); Arumugam Jeganathan, Chelsea, MA (US); Yvan De Boeck, Medford, MA (US)

(73) Assignee: HYDRATION LABS, INC., Charlestown, MA (US)

( * ) Notice: Subject to any disclaimer, the term of this patent is extended or adjusted under 35 U.S.C. 154(b) by 366 days.

(21) Appl. No.: 18/466,545

(22) Filed: Sep. 13, 2023

(65) Prior Publication Data

US 2025/0086039 A1 Mar. 13, 2025

(51) Int. Cl.
*G06F 11/07* (2006.01)

(52) U.S. Cl.
CPC .......... *G06F 11/076* (2013.01); *G06F 11/079* (2013.01)

(58) Field of Classification Search
CPC ............................. G06F 11/076; G06F 11/079
See application file for complete search history.

(56) References Cited

U.S. PATENT DOCUMENTS 6,075,464 A * 6/2000 Cloutier .................... G01B 7/14 340/870.37
2007/0204930 A1* 9/2007 Phallen ................ B67D 1/0888 222/394
2013/0080081 A1* 3/2013 Dugger ................. G01F 15/063 73/861.25
2014/0346198 A1 11/2014 Bond
2018/0251358 A1* 9/2018 Wing .................... B67D 1/0039
2019/0152759 A1 5/2019 Renzi
2020/0031654 A1 1/2020 Wing et al.
2021/0022547 A1 1/2021 Stork genannt Wersborg
2021/0088462 A1* 3/2021 Skaling .................. G01N 13/04
2021/0238022 A1 8/2021 McDougall et al.
2021/0279674 A1* 9/2021 Anido ................... G01F 11/265
2022/0053970 A1* 2/2022 Canet Peiro ........ A47J 31/5253
2024/0034609 A1* 2/2024 Lange .................. B67D 3/0077

OTHER PUBLICATIONS

Arantes et al, Relative Permittivity Meter Using a Capacitive Sensor and an Oscillating Current Source, 2019, p. 806-811. (Year: 2019).*
Kim et al. Measurement of the relative permittivity of the liquid phase of R454C with vapor quality change under two-phase condition, Jun. 24, 2023, International Communications in Heat and Mass Transfer, p. 1-11 (Year: 2023).*
International Search Report and Written Opinion received in International application No. PCT/US24/42069 mailed on Oct. 25, 2024.

* cited by examiner

*Primary Examiner* — Kidest Worku
(74) *Attorney, Agent, or Firm* — Bradley Arant Boult Cummings LLP; Adam J. Thompson

(57) ABSTRACT

The system can include a pump configured to control the flow rate of a liquid through a channel, sensors adjacent to the channel, and a computing device in communication with the sensors and coupled to the pump. The computing device can receive a signal corresponding to a measurement associated with the fluid from the sensors. The computing device can calculate a value based on the received signal. The computing device can determine that the calculated value exceeds a predefined threshold and perform a remedial action to adjust the flow rate of the liquid.

20 Claims, 7 Drawing Sheets

CONCENTRATE CONTROL SYSTEMS AND METHODS

TECHNICAL FIELD

The present systems and processes relate to liquid flow rate sensor and control systems.

BACKGROUND

Beverage dispensing devices can combine still or carbonated water with a flavor concentrate. Flavor concentrates can be a water-based solution containing sugar, salt, flavorings, and preservatives. In ideal operating conditions, beverage dispensing devices should dispense a consistent ratio of flavor concentrate relative to water every time a same-flavored beverage is dispensed from the device. Flavor concentrates can be stored in plastic bags or other containers (e.g., reservoir). Oftentimes, the plastic bag or other container storing the flavor concentrate can include both the liquid flavor concentrate and air. As a flavor concentrate is dispensed and a reservoir becomes depleted, air bubbles can be form in the flavor concentrate as the flavor concentrate is pumped out of the reservoir. The air bubbles can occupy space intended for the flavor concentrate within a dispensing pathway. The air bubbles can cause an inconsistent volume of flavor concentrate to be dispensed when a beverage is dispensed, causing the dispensed beverage to have a weak or inconsistent flavor.

Since air bubbles can form in flavor concentrate as a reservoir becomes low, reservoirs are often replaced early (e.g., before being fully depleted) even when flavor concentrate is remaining in the reservoir. For example, reservoirs are often replaced with 10% to 20% of the flavor concentrate remaining in the reservoir. When replaced early, the remaining concentrate can be wastefully discarded in the garbage. If a reservoir is not replaced early, dispensed beverages can have a weak or inconsistent flavor. Therefore, there is a long-felt but unresolved need for systems to dispense a consistent amount of flavor concentrate from when a reservoir is full until a reservoir is substantially empty.

BRIEF SUMMARY OF THE DISCLOSURE

Briefly described, and according to one embodiment, aspects of the present disclosure generally relate to liquid flow rate sensors and control systems in beverage dispensing devices. Beverage dispensing devices can combine still or carbonated water with a flavor concentrate. Flavor concentrates can include a water-based solution containing sugar, salt, flavorings, and/or preservatives. Beverage dispensing devices should dispense a consistent volume of flavor concentrate every time a beverage is dispensed from the device. Flavor concentrates can be stored in plastic bags or other containers (e.g., reservoir) and a mechanical pump can pump the flavor concentrate out of the reservoir so that the flavor concentrate may be combined with the still or carbonated water at a destination (e.g., the location in the beverage dispensing device where the flavor concentrate can be combined with the still or carbonated water). As a flavor concentrate is dispensed and a reservoir is depleted, air bubbles can be form in the flavor concentrate as it is pumped out of the reservoir. As air bubbles form in the flavor concentrate, the flow rate of the liquid can decrease. The decreased flow rate can cause the volume of flavor concentrate dispensed at the destination to decrease, causing the dispensed beverage to have a weak or inconsistent flavor.

A variable speed pump can control the flow of fluid (e.g., flavor concentrate) out of a reservoir and into the destination. One or more sensors can be attached to pathway carrying the liquid from the reservoir to the destination. The pathway can be formed by a conduit, such as a tube or pipe. The sensors can be capacitive sensors that can measure the relative permittivity (e.g., dielectric constant, ε) of the fluid (e.g., the liquid and air bubbles) in the conduit. The measured relative permittivity of the fluid can indicate the concentration of air bubbles in the liquid and thus, the relative flow rate of the liquid.

The system can receive a signal from the sensors. The received signal can include noise (e.g., high frequency dips or fluctuations) caused by the bubbles. The system can calculating a value based on the received signal in order to generate a new signal that amplify the changes in the received signal, whereas the changes in the received signal can be obfuscated by the noise. The calculated value can be a moving average, such as a 4-point moving average. The calculated value can be a noise-to-signal ratio. The calculated value can be rolling average (e.g., a moving average) or an estimate flow rate. The system can determine if the calculated value exceeds a threshold. The threshold can be a statistically significant value (e.g., moving average, rolling average, estimated flow rate, noise-to-signal ratio) indicating a decrease in the liquid flow rate. If the system determines that the calculated value exceeds the threshold, the system can determine that increasing bubbles are in the liquid and the liquid flow rate is decreasing.

If the system determines the calculated value exceeds the threshold, a remedial action can be performed. For example, if the calculated value exceeds the threshold, the system can limit the number of beverages dispensed before requiring the reservoir to be replaced. For example, if the calculated value exceeds the threshold, the flow rate can be increased by a predefined percentage or by an amount based on the calculated value. For example, if the calculated value exceeds the threshold, the system can required that the reservoir is replaced before dispensing any beverages. For example, if the calculated value exceeds the threshold, the system can transmit an order for a new reservoir. The system can generate a notification related to the reservoir (e.g., the reservoir is low, the reservoir needs to replaced).

The above and further features of the disclosed systems and methods will be recognized from the following detailed descriptions and drawings of various embodiments.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
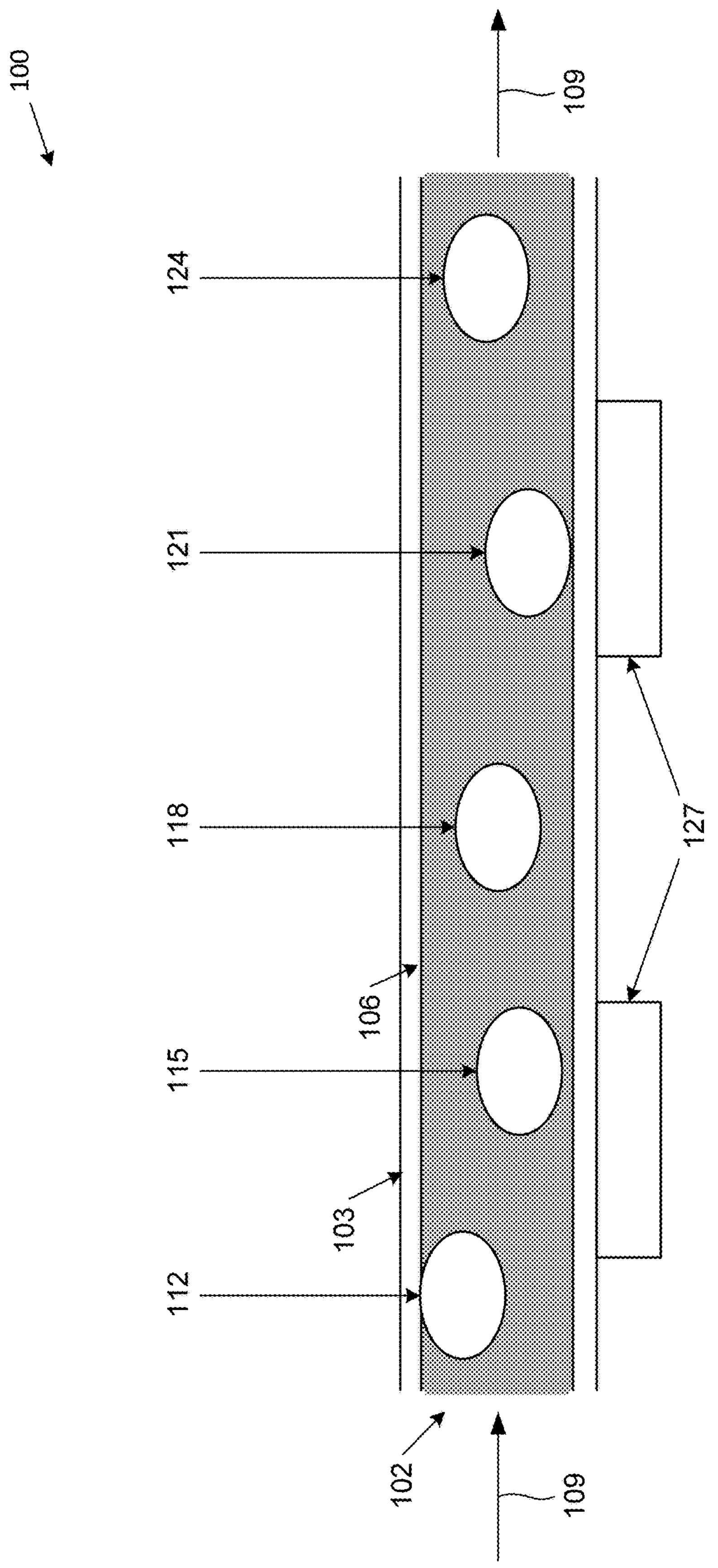
FIG. 1A illustrates an exemplary liquid flow rate sensor system according to various embodiments of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to liquid flow rate sensors and control systems in beverage dispensing devices. The system can include a reservoir containing liquid (e.g., flavor concentrate). A variable speed pump can be connected to the reservoir via conduit or channels. The pump can pump the liquid from the reservoir to the destination. As a liquid is dispensed and a reservoir is depleted, air bubbles can be form in the flavor liquid as it is pumped out of the reservoir. As air bubbles form in the flavor concentrate, the flow rate of the liquid can decrease. The decreased flow rate can cause the volume of flavor concentrate dispensed at the destination to decrease, causing the dispensed beverage to have a weak or inconsistent flavor.

One or more sensors can be in contact with, attached to, or adjacent to the conduit. The sensors can be capacitive sensors that can measure the relative permittivity (e.g., dielectric constant, ε) of the fluid (e.g., the liquid and air bubbles) in the conduit. As will be understood by one having ordinary skill in the art, the relative permittivity of water or a water-based solution is higher than the relative permittivity of air. If there are no air bubbles in the liquid, the measured relative permittivity of the fluid will be approximately the relative permittivity of water within the conduit. If there is a low concentration of air bubbles in the liquid (e.g., a low ratio of air bubbles to liquid), the measured relative permittivity of the fluid will be between the relative permittivity of water and air within the conduit. If there is a high concentration of air bubbles in the liquid (e.g., a high ratio of air bubbles to liquid), the measure relative permittivity of the fluid will be close to or approximately the relative permittivity of air within the conduit. The measured relative permittivity can be inversely proportional to the concentration of air bubbles in the liquid. Since the concentration of air bubbles can be inversely proportional to the liquid flow rate (e.g., because less liquid is flowing when a constant fluid rate is maintained due to the volume occupied by air within the fluid), the measured relative permittivity can be proportional to the relative liquid flow rate. As will be understood and appreciated, as used herein, liquid/fluid flow rate can refer to a rate at which liquid/fluid flows through a conduit and relative liquid/fluid flow rate can refer to a relative rate at which liquid/fluid flows through the conduit relative to other liquid/fluid flow rates. As an example, when a flow rate of fluid decreases in the conduit, the system can use sensor measurements to detect that the fluid rate is decreased relative to a previously measured flow rate before the flow rate decreased.

The system can receive a signal from the one or more sensors adjacent to the conduit carrying the liquid. The received signal can include noise (e.g., high frequency dips or fluctuations) caused by the bubbles. Noise can obfuscate changes in the received signal, which can cause difficulties in determining the changes to the liquid flow rate. Calculating a value based on the received signal can amplify changes in the received signal. Since the calculated value can amplify changes in the received signal, the calculated value can indicate a high concentration of bubbles in the liquid and a decrease liquid flow rate. The calculated value can be a moving average, such as a 4-point moving average. The calculated value can be a noise-to-signal ratio. The noise-to-signal ratio can amplify any changes in the received signal by several magnitudes (e.g., amplify changes in the received signal by 100% to 1000%). The noise-to-signal ratio can be the rolling standard deviation or the rolling standard deviation squared divided by the rolling average squared. For both the rolling standard deviation and the rolling average, the sampling window (e.g., range of data used for the calculations) can be any appropriate range, such as a period of time (e.g., 5 minutes, 30 minutes, 1 hour, 24 hours), reservoir capacity (e.g., a volume or percentage of liquid dispensed or remaining), or over the entire life of the reservoir. In some embodiments, the sampling window can be related to the time it takes for a volume of liquid to move a distance. For example, the sampling window can be a time it takes for the fluid to move from the sensors to the destination. In this example, the measurement and calculation of bubbles via the sensors can correspond to when the bubbles reach the destination. The calculated value can be rolling average or an estimate flow rate. The estimated flow rate can be calculated by dividing the difference between the rolling average and the low water mark value of the rolling average by the difference between the high water mark value of the rolling average and the low water mark value of the rolling average.

The system can determine if the calculated value exceeds a threshold. The threshold can be a statistically significant value (e.g., moving average, rolling average, estimated flow rate, noise-to-signal ratio) indicating a decrease in the liquid flow rate. The thresholds can be received as an input or calibrated based on the liquid flow rate. The thresholds can be determined based on historical data associated with previous liquid flow rates. If the system determines that the calculated value exceeds the threshold, a high concentration of bubbles can be in the liquid and the liquid flow rate can be decreasing.

If the system determines the calculated value exceeds the threshold, a remedial action can be triggered. For example, if the calculated value exceeds the threshold, the system can limit the number of beverages dispensed before requiring the reservoir to be replaced. For example, if the calculated value exceeds the threshold, the flow rate can be increased by a predefined percentage or by an amount based on the calculated value. For example, if the calculated value exceeds the threshold, the system can required that the reservoir is replaced before dispensing any beverages. For example, if the calculated value exceeds the threshold, the system can transmit an order for a new reservoir. The system can perform the remedial action and generate a notification. The notification can indicate that the reservoir is low. The notification can indicate that the reservoir needs to be replaced. The notification can indicate that a new reservoir needs to be ordered. The notification can indicate that the dispensing device requires maintenance.

Exemplary Embodiments

Figure 1B:
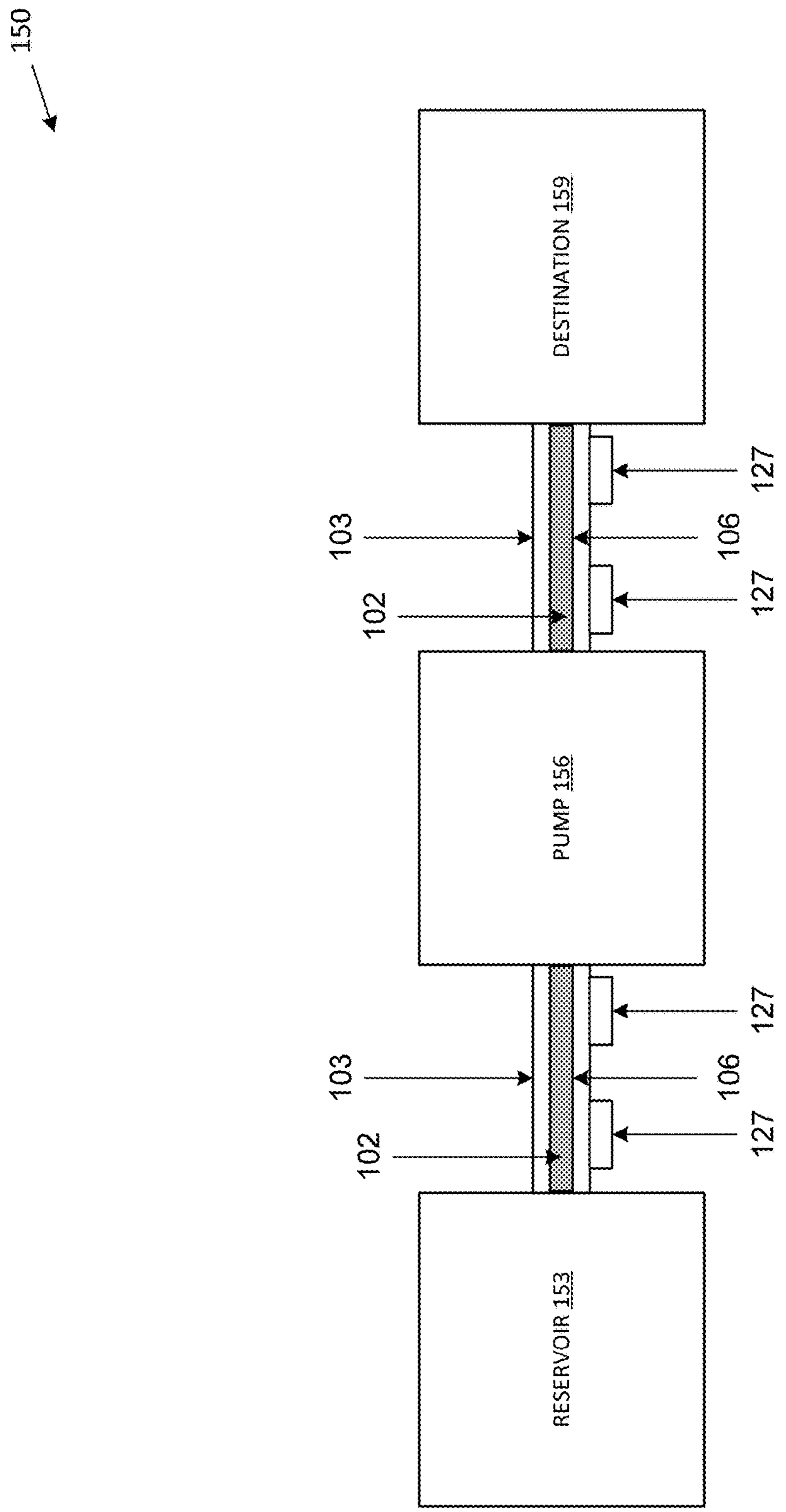
FIG. 1B illustrates an exemplary reservoir and pump system according to various embodiments of the present disclosure.

Referring now to the figures, for the purposes of example and explanation of the fundamental processes and components of the disclosed systems and processes, reference is made to FIG. 1A, which illustrates an exemplary liquid flow rate sensor system 100. As will be understood and appreciated, the liquid flow rate sensor system 100 shown in FIG. 1A and the reservoir and pump system 150 shown in FIG. 1B represent merely one approach or embodiment of the present system, and other aspects are used according to various embodiments of the present system.

Exemplary liquid flow rate sensor system 100 can include a conduit 103 containing liquid 106. The conduit 103 can be a hose, pipe, channel, or any device that allows for the flow of liquid over a distance. The liquid 106 can be any liquid, including but not limited to, water or flavor concentrate for use in a beverage machine. The liquid 106 can travel along the conduit 103 in the direction 109 (e.g., from the left side to the right side of FIG. 1). As will be described in reference to FIG. 1B, the conduit 103 can be connected to a liquid reservoir and a pump used to direct the liquid 106 from the reservoir to a destination. The liquid flow rate sensor system 100 can include a fluid 102 that includes liquid 106 and one or more air bubbles 112, 115, 118, 121, and 124. When a flow rate of the fluid 102 in the conduit 103 is constant, the flow rate of the liquid 106 decreases and a flow rate of air increases when the ratio of air to liquid 106 in the conduit 103 increases from air bubbles 112, 115, 118, 121, and 124.

It can be desirable for the liquid 106 to have a consistent flow rate through the conduit 103. The flow rate can be defined as the volume of the liquid 106 that passes through a cross section of the conduit 103 in a defined period of time. For example, the flow rate can be represented by volume over time (e.g., milliliters per second, pints per minute). As an example, the liquid 106 can be a flavor concentrate. The flavor of the resulting beverage can vary with each dispensed beverage when the flow rate for the liquid 106 is inconsistent each time a beverage is dispensed. As will be understood and appreciated, bubbles in the liquid 106 can cause the flow rate of the liquid 106 to decrease. The liquid 106 can include one or more bubbles, including bubbles 112, 115, 118, 121, and 124. The bubbles can be air or gas pockets in the liquid 106. If bubbles are present in the liquid 106, then the volume of liquid 106 that can pass through a cross section of the conduit 103 may decrease for a given fluid flow rate, which may cause the liquid flow rate to decrease.

One or more sensors 127 can be in contact with, attached to, or adjacent to the conduit 103. The sensors 127 can measure the permittivity of the fluid 102 in the conduit 103. The sensors 127 can be any sensor capable of measuring the permittivity of the fluid 102 in the conduit 103. The sensors 127 can be a single sensor or multiple sensors arranged along the conduit 103. The sensors 127 can be a capacitive sensor, such as a capacitive sense pad or a capacitive touch pad. If the sensors 127 are capacitive sense pads, the sensors 127 can measure the relative permittivity (e.g., dielectric constant, ε) of the fluid 102 in the conduit 103 (e.g., the liquid 106 and the bubbles 112, 115, 118, 121, and 124). For example, if the liquid 106 is a water-based solution (e.g., a flavor concentrate) and the bubbles 112, 115, 118, 121, and 124 are air bubbles, the liquid 106 can have a higher relative permittivity than the bubbles 112, 115, 118, 121, and 124. For example, if there are no bubbles in the liquid 106, the relative permittivity of the fluid 102 in the conduit 103 can be high. For example, if there is a high concentration of air bubbles in the liquid 106, the relative permittivity of the fluid 102 in the conduit 103 can be close to the relative permittivity of air. For illustrative purposes, the exemplary relative permittivity (e.g., dielectric constant) of several exemplary fluids are shown below:

TABLE 1

| Substance | ε | σ (μS/cm) |
|---|---|---|
| Air | 1.00 | 0.0 |
| Silicone Oil | 2.78 | 0.0 |
| Diethyl Ether | 4.27 | 0.0 |
| Isopropanol | 19.74 | 0.1 |
| Glycol | 40.56 | 1.5 |
| Deionized Water | 79.86 | 2.5 |
| Water + Salt | 79.86 | 13.1 |

The measured relative permittivity of the fluid 102 in the conduit 103 (e.g., the relative permittivity measured by the sensors 127) can correlate to the concentration of bubbles in the liquid 106. For example, a reduction in the measured permittivity in the fluid 102 can indicate an increase in the concentration of bubbles in the liquid 106. A consistent permittivity exceeding a predefined threshold can indicate an absence of bubbles in the liquid 106. A low measured relative permittivity can indicate a high concentration of bubbles in the liquid 106 and a high measured relative permittivity can indicate a lower concentration of bubbles in the liquid 106.

Referring now to FIG. 1B, shown is an exemplary reservoir and pump system 150. The exemplary reservoir and pump system 150 can include the reservoir 153, the pump 156, and the destination 159, which can be connected by the conduit 103. The reservoir 153 can be any container capable of storing the liquid 106. For example, the reservoir 153 can be a bag of flavor concentrate. In some embodiments, the reservoir 153 can be partially filled with air to enable sensing when the reservoir 153 is near empty and/or empty. For example, the reservoir 153 can be filled with 1% air to facilitate the sensing of bubbles 112, 115, 118, 121, and 124 when the reservoir 153 empties beyond a threshold amount (e.g., 80% empty, 100% empty, etc.). In various embodiments, the amount of air can be between 0.1% and 10%. The pump 156 can be any pump capable of moving the liquid 106. The pump 153 can be a variable speed mechanical pump capable of adjusting the flow rate of the liquid 106. The pump 156 can move the liquid 106 from the reservoir 153 to the destination 159 via the conduit 103. The destination 159 can be any destination for the liquid 106. For example, if the liquid 106 is a flavor concentrate, the destination 159 can be where the flavor concentrate combines with still or carbonated water. The destination 159 can be where the liquid 106 is dispensed. The bubbles can form due to air or gas in the conduit 103, the reservoir 153, or the pump 156. For example, if the reservoir 153 is low (e.g., the amount of liquid 106 in the reservoir 153 is less than the capacity of the reservoir 153), then bubbles can form in the liquid 106 as the pump 156 moves the liquid 106 from the reservoir into the conduit 103. As another example, if air is present in the reservoir 153, then bubbles can form in the liquid 106 as the pump 156 moves the liquid 106 from the reservoir into the conduit 103. As will be understood and appreciated, bubbles can become prevalent if the reservoir 153 is low.

In addition to a consistent flow rate, it can be desirable for a consistent volume of the liquid 106 to be dispensed into the destination 159. For example, if the liquid 106 is a flavor concentrate, it can be desirable for a consistent volume of the flavor concentrate to combine with still or carbonated water each time a beverage is dispensed. If the flow rate of the liquid 106 varies, then the volume of the liquid 106 dispensed into the destination 159 can vary. For example, if the fluid 102 includes a high concentration of bubbles (e.g., a high air bubble to liquid 106 ratio), then the volume of the liquid 106 dispensed into the destination 159 can decrease. For example, if the fluid 102 has no bubbles (e.g., a low air bubble to liquid 106 ratio), then the volume of the liquid 106 dispensed into the destination 159 can be standard volume of the liquid 106 (e.g., the standard volume of the liquid 106 can be the volume of liquid necessary to dispense a beverage such that each beverage dispensed has a consistent amount of flavor concentrate and consistent flavor). Thus, as will be understood and appreciated, a high measured relative permittivity can indicate a high concentration of bubbles in the liquid 106 and thus a low relative flow rate and dispensed volume (e.g., the volume of the liquid 106 dispensed into the destination 159). Similarly, a low measured relative permittivity can indicate a low concentration of or no bubbles in the liquid 106 and thus a high relative flow rate and dispensed volume.

As will be understood and appreciated, bubbles may be less prevalent if the reservoir 153 is near capacity and bubbles may become more prevalent if the reservoir 153 is low. Thus, as reservoir 153 is depleted, the dispensed volume of the liquid 106 in a fluid flow can decrease unless the flow rate of the fluid 102 is increased. The pump 156 can be a variable speed pump capable of adjusting the flow rate of the fluid 102 such that a consistent volume of the liquid 106 can be dispensed into the destination 159. If the sensors 127 measure a high relative permittivity of the fluid 102 in the conduit 103 (thus indicating no bubbles or a low concentration of bubbles), the pump 156 can maintain a consistent flow rate and volume of liquid 106 dispensed in the destination 159. Thus, the pump 156 can maintain a consistent fluid flow rate and dispensed volume of the liquid 106 when the reservoir 153 is near capacity. If the sensors 127 measure a low relative permittivity of the fluid 102 in the conduit 103 (thus indicating a high concentration of bubbles), the pump 156 can increase the flow rate of the fluid 102 such that a consistent volume of the liquid 106 can be dispensed into the destination 159. Thus, the pump 156 can increase the flow rate of the liquid 106 as the reservoir 153 is depleted.

Figure 2:
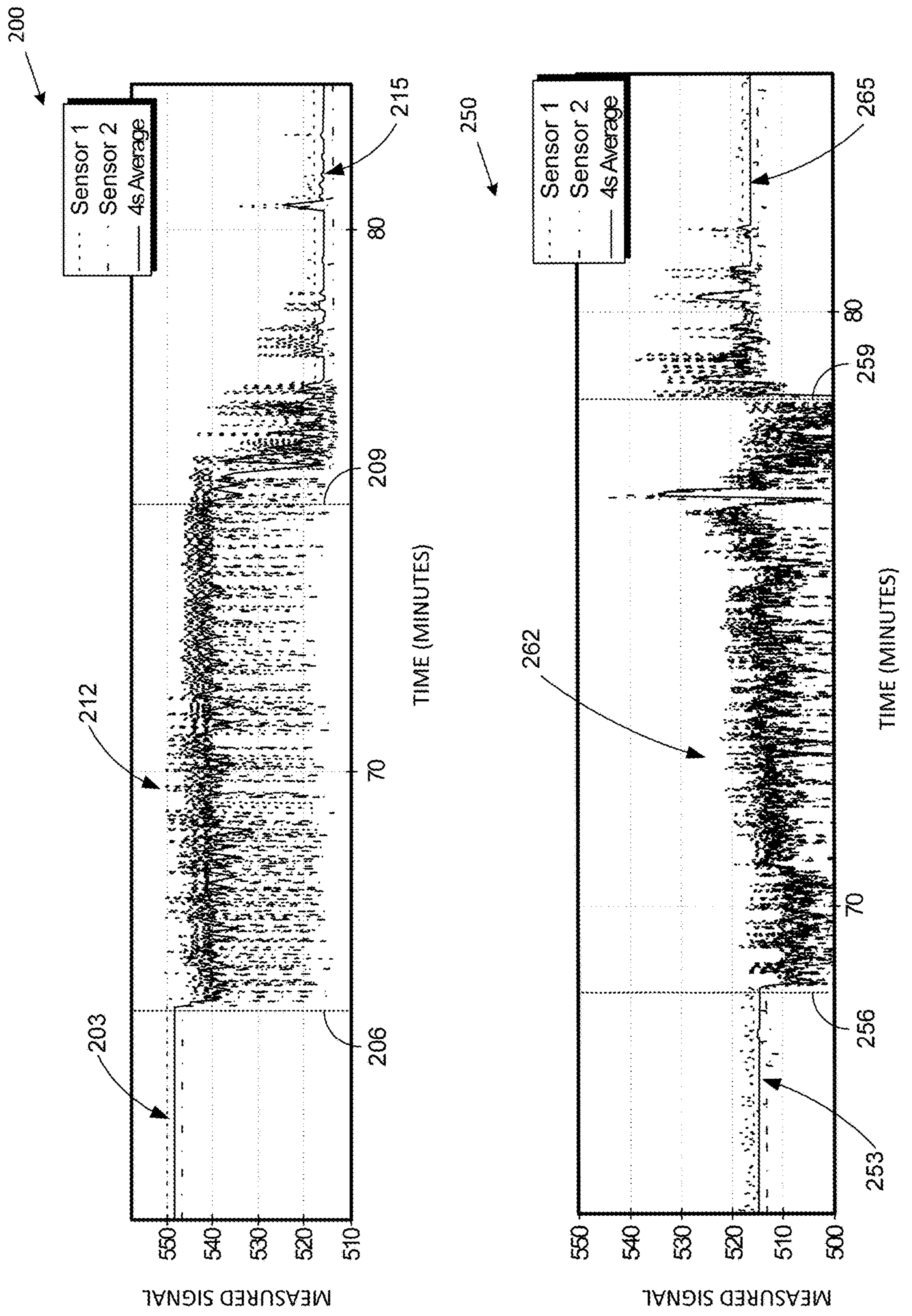
FIG. 2 illustrates exemplary signal graphs according to various embodiments of the present disclosure.

Referring now to FIG. 2, exemplary signal graphs 200 and 250 are shown according to various embodiments of the present disclosure. As will be understood and appreciated, the exemplary signal graphs 200 and 250 merely represent sample data from an exemplary liquid flow rate sensor system and merely represent one approach or embodiment of the present system. As will be understood and appreciated, the signal graphs 200 and 250 can include signal data from two different dispensing devices. The signal graphs 200 and 250 can include an X axis measuring time in minutes and a Y axis showing a measured signal. As an example, the measured signal can be a measured relative permittivity of the fluid 102 in a conduit or channel. The signal graphs 200 and 250 can include measurements from two sensors, sensor 1 (e.g., shown as a dotted line on the signal graphs 200 and 250) and sensor 2 (e.g., shown as a dash dot dot line on the signal graphs 200 and 250). The signal graphs 200 and 250 can include an average measurement (e.g., shown as the solid line on the signal graphs 200 and 250), which can show the average measurement from sensor 1 and sensor 2. The average measurement can be a 4-point moving average.

The average measurement on the signal graph 200 can include section 203, which can show an initial average measurement of approximately 548 units. The section 203 can show a constant average from the start of the graph until line 206. The line 206 (e.g., a dashed vertical line) can mark approximately 65 minutes on the signal graph 200. The line 209 (e.g., a dashed vertical line) can mark approximately 74 minutes on the signal graph 200. Between the line 206 and the line 209, the signal graph 200 can include a noise section 212. The noise section 212 can show high frequency dips and fluctuations in the measurements from sensor 1 and sensor 2. The noise section 212 can be caused by air bubbles in liquid. As will be understood and appreciated, due to the difference in relative permittivity of air and water, an increased concentration (e.g., increasing air bubble to liquid ratio) can cause noise (e.g., high frequency dips and fluctuation) in the measurements from sensor 1 and sensor 2. In one exemplary embodiment, the noise section 212 starts at the line 206 (e.g., approximately 65 minutes) and continues to the line 209 (e.g., approximately 74 minutes). The noise can obfuscate changes in the average measurement. After the line 209, the average measurement can include section 215, which shows an average measurement of approximately 515 units.

The average measurement on the signal graph 250 can include section 253. Section 253 shows an initial average measurement of approximately 515 units. The section 253 can show a constant average from the start of the graph until line 256. The line 256 (e.g., a dashed vertical line) can mark approximately 68 minutes on the signal graph 250. The line 259 (e.g., a dashed vertical line) can mark approximately 78 minutes on the signal graph 250. Between the line 256 and the line 259, the signal graph 250 can include a noise section 262. The noise section 262 can show high frequency dips and fluctuations in the measurements from sensor 1 and sensor 2. The noise section 262 can be caused by air bubbles in liquid. The noise section 262 can start at the line 256 (e.g., approximately 68 minutes) and continue to the line 259 (e.g., approximately 78 minutes). After the line 259, the average measurement can include section 265, which can show an average measurement of approximately 516 units.

The exemplary signal graphs 200 and 250 can illustrate the signal discrepancies among different dispensing devices. Sections 203 and 253 can show different initial average measurements. The noise sections 212 and 262 can begin and end at different times. Thus, the signal discrepancies can present challenges when determining when and how much to increase the liquid flow rate via the pump. In some examples, capacitive sensors (e.g., sensor 1 and sensor 2) can be sensitive to temperature changes. Thus, each dispensing device may adjust the liquid flow rate at times depending on the particular dispensing device.

Figure 3:
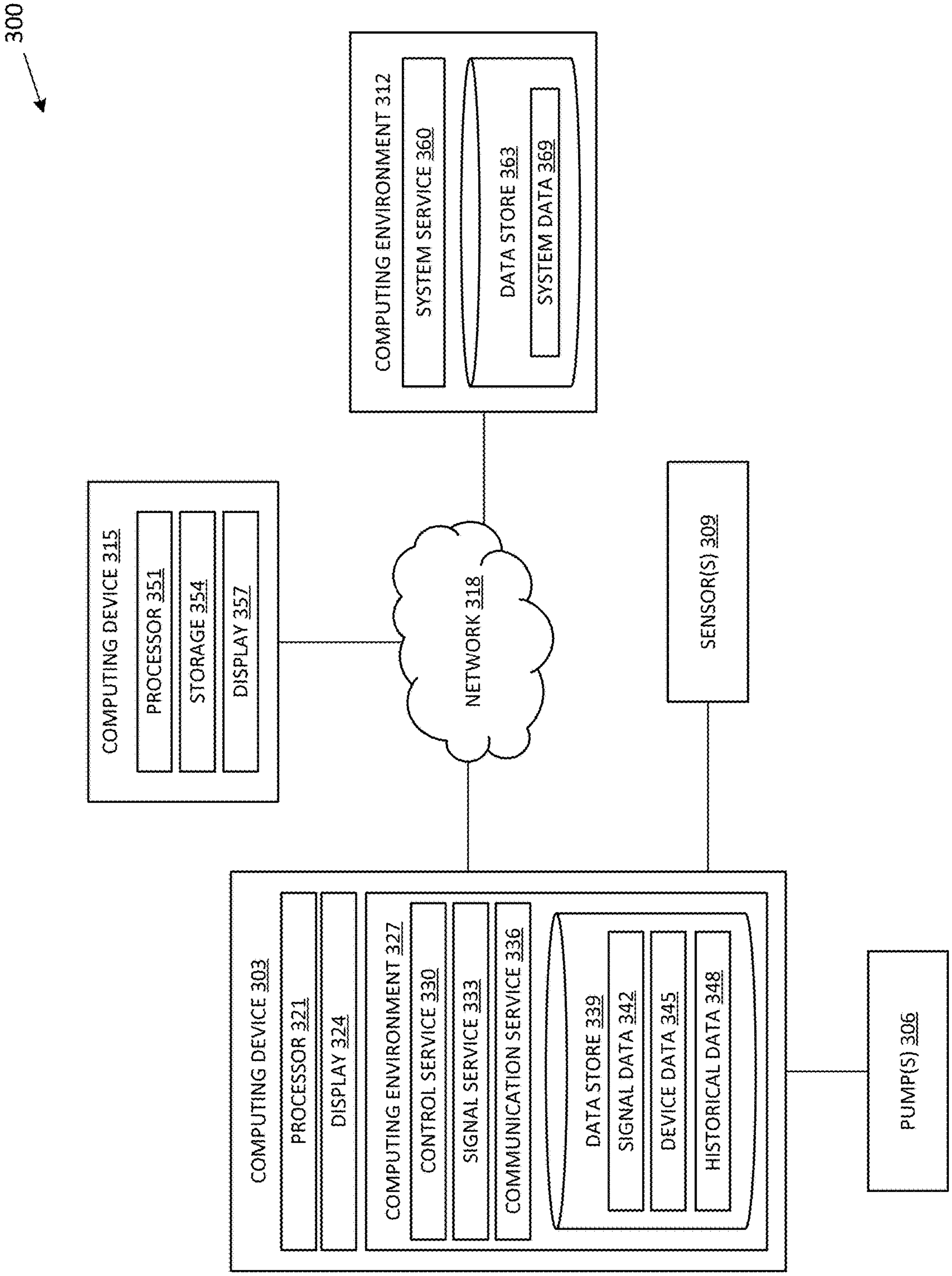
FIG. 3 illustrates an exemplary networked environment for the disclosed system according to various embodiments of the present disclosure.

Referring now to FIG. 3, shown is an exemplary networked environment 300 for the liquid flow rate sensor system according to various embodiments of the present disclosure. As will be understood and appreciated, the exemplary networked environment 300 shown in FIG. 3 represents merely one approach or embodiment of the present system, and other aspects are used according to various embodiments of the present system. Exemplary networked environment 300 can include, but is not limited to, a computing device 303 connected to the one or more pumps 306 and the one or more sensors 309. In one embodiment, the computing device 303 can be connected to the computing environment 312 and the computing device 315 over a network 318. According to another embodiment, the computing device 303 can be connected to the one or more pumps 306 and the one or more sensors 309 without any connection to the network 318.

The computing device 303 can include one or more computing device in the dispensing device. According to various embodiments, the computing device 303 can include any device capable of accessing network 318 including, but not limited to, a computer, smartphone, tablets, or other device. In one embodiment, the networked environment 312, computing device 303, and computing device 315 can be integrated into a single device without utilizing a network. The computing device 303 can include a processor 321 and a display 324 on which various user interfaces can be rendered to allow users to configure, monitor, control, and command various functions of networked environment 300. In various embodiments, computing device 303 can include multiple computing devices. Regardless, the computing device 303 can include one or more processors and memory having instructions stored thereon that, when executed by the one or more processors, cause the computing device 303 to perform one, some, or all of the actions, methods, steps, or functionalities provided herein.

The computing device 303 can include the computing environment 327. The elements of the computing environment 327 can be provided via one or more computing devices, including the computing device 303, which can be arranged, for example, in one or more server banks or computer banks or other arrangements. Such computing devices can be located in a single installation or may be distributed among many different geographical locations. For example, the computing environment 327 can include one or more computing devices that together may include a hosted computing resource, a grid computing resource, or any other distributed computing arrangement. In some cases, the computing environment 327 can correspond to an elastic computing resource where the allotted capacity of processing, network, storage, or other computing-related resources may vary over time. Regardless, the computing environment 327 can include one or more processors, including the processor 321, and memory having instructions stored thereon that, when executed by the one or more processors, cause the computing environment 327 to perform one, some, or all of the actions, methods, steps, or functionalities provided herein.

The computing environment 327 can include a control service 330, a signal service 333, a communication service 336, and a data store 339. The control service 330, the signal service 333, and the communication service 336 can correspond to one or more software executables that can be executed by the computing environment 327 to perform the functionality described herein. While the control service 330, the signal service 333, and the communication service 336 are described as different services, it can be appreciated that the functionality of these services can be implemented in one or more different services executed in the computing environment 327. Various data can be stored in the data store 339, including but not limited to, the signal data 342, the device data 345, and the historical data 348.

The control service 330 can transmit signals to control one or more characteristics of the pump 306, such as a rate of pumping fluid or an amount of power provided to the pump to pump fluid. The control service 330 can transmit a command to the pump to adjust the flow rate of the fluid. The control service 330 can transmit a command to increase or decrease the flow rate of the liquid by changing the flow rate of the fluid. The control service 330 can set the initial flow rate of the pump. For example, the initial fluid flow rate of the pump can be calibrated such that an appropriate volume of the liquid is dispensed into the destination. The initial flow rate of the pump can be received as an input via the computing device 303, the computing device 315, or the system service 360. The control service 330 can transmit a command or signal to the pump 306 to increase or decrease the flow rate based on an input received via computing device 303, the computing device 315, or the system service 360. For example, a user may desire a beverage with a stronger flavor and thus desire additional flavor concentrate. The control service 330 can command the pump to increase the flow rate to dispense additional liquid (e.g., more than the standard volume of liquid). As an example, a user may desire a beverage with a weaker flavor and thus desire less flavor concentrate. The command service 330 can command the pump to decrease the flow rate to dispense less liquid (e.g., less than the standard volume of liquid).

The control service 330 can command the pump 306 to increase the flow rate based on a signal received by the signal service 333. For example, the control service 330 can command the pump 306 to increase the liquid flow rate by a predefined percentage (e.g., 1% to 100%). For example, if the signal received by the signal service 333 indicates a 5% decrease in the liquid flow rate, the control service 330 can command the pump 306 to increase the liquid flow rate by 5% to compensate for the decrease. The control service 330 can cause the pump to maintain a consistent liquid flow rate during the life of the reservoir (e.g., from the time the reservoir is installed until the reservoir is empty). For example, the control service 330 can command the pump 306 to adjust the liquid flow rate such that the standard volume of liquid is dispensed each time a beverage is dispensed. The control service 330 can modify properties of pulse width modulation of the pump. The commands transmitted to the pump 306 by the control service 330 can be stored as the device data 345. In some embodiments, the control service 330 can generate a pulse width modulated signal to control the speed of the pump.

The signal service 333 can receive a signal from the sensors 309. The signal received by the signal service 333 can be any measurement from the sensors 309 associated with the liquid or fluid (e.g., the liquid and the air bubbles). The signal service 333 can receive a signal that corresponds or correlates to the composition of the fluid (e.g., the composition of the liquid and/or the air bubbles). The signal received by the signal service 333 can be a measurement of the relative permittivity (e.g., dielectric constant, $\varepsilon$) of the fluid (e.g., the liquid and any air bubbles in the liquid). As will be understood and appreciated, the relative permittivity of the fluid can be inversely proportional to the concentration of air bubbles in the liquid and proportional to the liquid flow rate. Thus, the signal service 333 can receive a relative permittivity measurement (e.g., the signal) that can indicates changes to composition of the fluid at the sensors. The change of the composition of the fluid at the sensors can indicate a change to the flow rate of the liquid.

The signal service 333 can calculate a value based on the received signal. The signal service 333 can calculate a value to amplify changes in the received signal. The signal service 333 can calculate a moving average using any appropriate number of points (e.g., 3-points, 4-points, 5-points) based on the received signal. In one embodiment, the signal service can calculate a noise-to-signal ratio based on the received signal as follows:

$$NSR = \frac{\sigma^2}{\mu^2}$$

where NSR can be the noise-to-signal ratio, σ can be the rolling standard deviation, and μ can be the rolling average. According to another embodiment, the noise-to-signal ratio can be the rolling standard deviation. For both the rolling standard deviation and the rolling average, the sampling window (e.g., range of data used for the calculations) can be any appropriate range, such as a period of time (e.g., 5 minutes, 30 minutes, 1 hour, 24 hours), reservoir capacity (e.g., a volume or percentage of liquid dispensed or remaining), volume of liquid (e.g., the volume of liquid between the sensors and the destination), or over the entire life of the reservoir.

The signal service 333 can calculate a rolling average based on the received signal as follows:

$$FSP = \frac{1}{k}\sum_{i=n-k+1}^{n}\frac{s_1 + s_2}{2}$$

where FSP can be the rolling average, k can be a period of time (e.g., measured in seconds, minutes, hours), n can be a summation index, i can be can be an iteration, $s_1$ and $s_2$ can be the received signals from at least two sensors (e.g., where $s_1$ can be a measurement from a first sensor and $s_2$ can be a measurement from a second sensor). The signal service 333 can use the rolling average to calculate an estimated flow rate as follows:

$$FR = \frac{FSP - LWM}{HWM - LWM}$$

where FR can be the estimated flow rate expressed as a percentage of a maximum flow rate, FSP can be the rolling average, LWM (e.g., low water mark) can be the lowest value for the rolling average, and HWM (e.g., high water mark) can be the highest value for the rolling average. As the rolling average is calculated, the low water mark and the high water mark can be saved as the signal data 342. As the low water mark and the high water mark changes, the saved low water mark and the high water mark can be updated. The low water mark and the high water mark can be tracked by an algorithm.

The signal service 333 can determine if the calculated value exceeds a threshold. The threshold can be a statistically significant value (e.g., moving average, rolling average, noise-to-signal ratio). The threshold can be received as an input or calibrated based on the liquid flow rate. If the signal service 333 determines that the calculated value exceeds a threshold, the signal service 333 can trigger an action. The signal service 33 can trigger an action including limiting the number of beverages dispensed before requiring the reservoir to be replaced. The signal service 333 can trigger an action including increasing the flow rate of the liquid via the pump 306.

The communication service 336 can generate a notification regarding the threshold. The communication service 336 can generate a notification that the reservoir is low. The communication service 336 can generate a notification that the reservoir is empty and needs to be replaced. The communication service 336 can generate a notification that a new reservoir needs to be order or transmit an order for a new reservoir. The communication service 336 can transmit the notification to the computing device 315 or the system service 360. The communication service 336 can display the notification on the display 324.

The pump 306 can be a variable speed pump. The pump 306 can adjust the flow rate of the liquid out of the reservoir to a destination. The sensors 309 can be any sensor capable of measuring a change in a composition of the fluid (e.g., the liquid and/or the air bubbles). The sensors 309 can be a capacitive sensor, such as a capacitive sense pad or a capacitive touch pad. The sensors 309 can measure the relative permittivity (e.g., dielectric constant, ε) of the fluid.

The networked environment 300 can include the computing environment 312. The elements of the computing environment 312 can be provided via one or more computing devices, including the computing device 303 and the computing device 315, which can be arranged, for example, in one or more server banks or computer banks or other arrangements. Such computing devices can be located in a single installation or may be distributed among many different geographical locations. For example, the computing environment 312 can include one or more computing devices that together may include a hosted computing resource, a grid computing resource, or any other distributed computing arrangement. In some cases, the computing environment 327 can correspond to an elastic computing resource where the allotted capacity of processing, network, storage, or other computing-related resources may vary over time. Regardless, the computing environment 312 can include one or more processors, and memory having instructions stored thereon that, when executed by the one or more processors, cause the computing environment 312 to perform one, some, or all of the actions, methods, steps, or functionalities provided herein.

The computing environment 312 can include the system service 360 and the data store 363. The system service 360 can receive notifications from the communication service 336. The system service 360 can receive device data 345 from multiple dispensing devices. The system service 360 can monitor multiple dispensing devices. The system service 360 can track reservoir levels for multiple dispensing devices. The system service 360 can generate notifications regarding reservoirs that are low or need to be replaced. The system service 360 can generate notifications regarding dispensing devices maintenance. The notifications, tracking, and monitoring data can be stored in the data store 363 as the system data 369.

The computing device 315 can be any computing device external from the dispensing device. According to various embodiments, the computing device 315 can include any device capable of accessing network 318 including, but not limited to, a computer, smartphone, tablets, or other device. The computing device 315 can include a processor 351 and storage 354. The computing device 315 can include a display 357 on which various user interfaces can be rendered to allow users to configure, monitor, control, and command various functions of networked environment 300. In various embodiments, computing device 315 can include multiple computing devices. Regardless, the computing device 315 can include one or more processors and memory having instructions stored thereon that, when executed by the one or more processors, cause the computing device 315 to perform one, some, or all of the actions, methods, steps, or functionalities provided herein.

The network 318 includes, for example, the Internet, intranets, extranets, wide area networks (WANs), local area networks (LANs), wired networks, wireless networks, or other suitable networks, etc., or any combination of two or more such networks.

Figure 4:
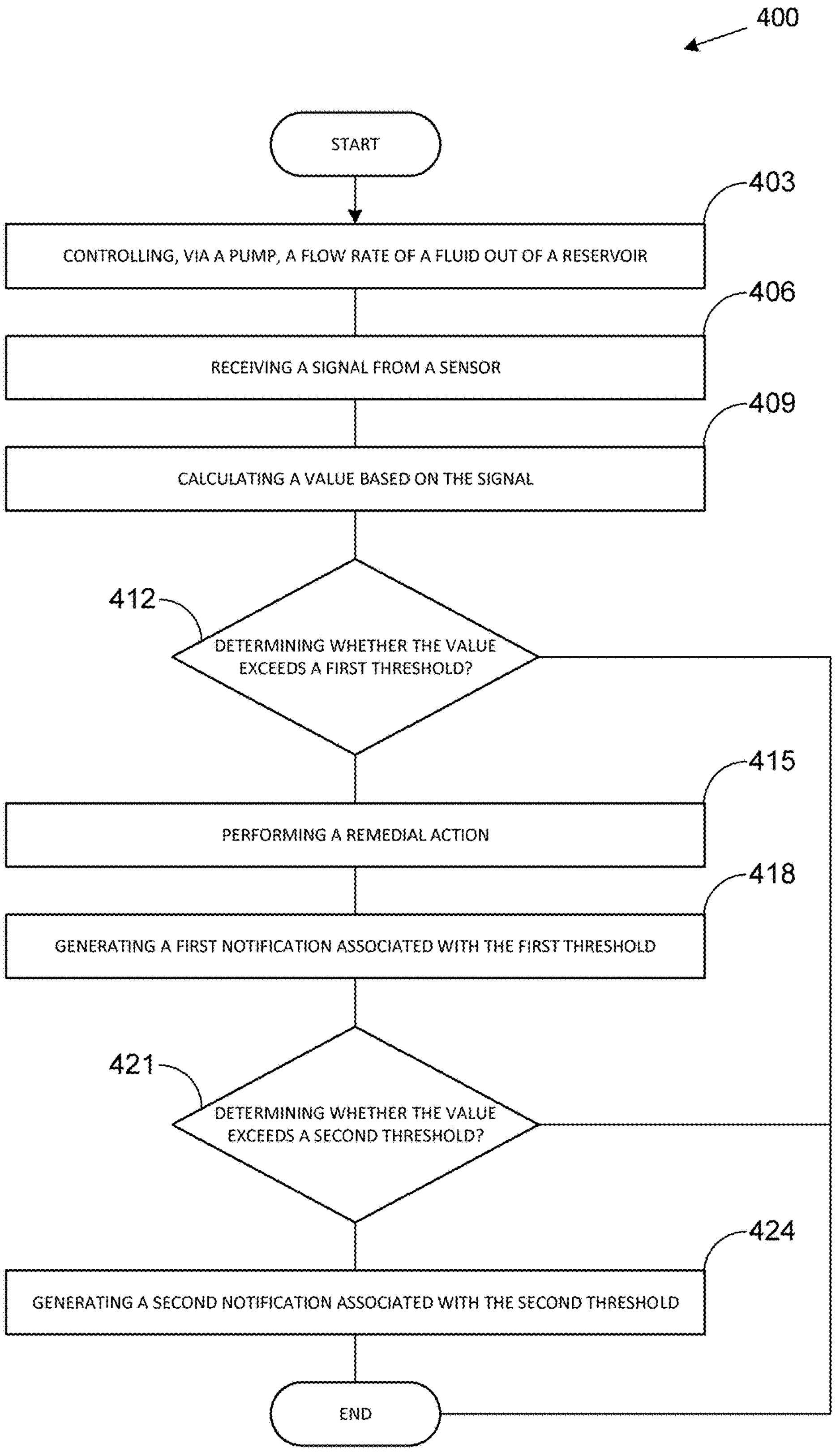
FIG. 4 illustrates an exemplary overall process for the disclosed system according to various embodiments of the present disclosure.

Referring now to FIG. 4, shown is an exemplary, high-level overview process 400 for according to various embodiments of the present disclosure. As will be understood by one having ordinary skill in the art, the steps and processes shown in FIG. 4 may operate concurrently and continuously, are generally asynchronous and independent, can be performed in part or in whole by a combination of one or more of the computing environment 327 and computing devices 303, and are not necessarily performed in the order shown and various steps can be executed linearly or in parallel. Process 400 can be performed entirely, partially, or in coordination with the control service 330, the signal service 333, and the communication service 336.

At step 403, the process 400 can include controlling a flow rate of fluid including the liquid out of the reservoir via the pump. The control service 330 can control the flow rate of the fluid out of the reservoir via the pump 306. The pump can be a variable speed pump capable of adjusting the flow rate of the liquid. The initial flow rate of the pump can be calibrated such that an appropriate volume of the liquid is dispensed into the destination. The initial flow rate of the pump can be received as an input via the computing device 303 or the computing device 315. The pump can maintain the initial flow rate as needed. For example, the pump can maintain the initial flow rate when the reservoir is near capacity and the concentration of bubbles in the liquid is low or minimal. The flow rate of the pump can be adjusted based on input received via the computing device 303 or the computing device 315. For example, a user may desire a beverage with a stronger flavor and thus desire additional flavor concentrate. The flow rate of the pump can be adjusted to dispense additional liquid (e.g., more than the standard volume of liquid). As an example, a user may desire a beverage with a weaker flavor and thus desire less flavor concentrate. The flow rate of the pump can be adjusted to dispense less liquid (e.g., less than the standard volume of liquid).

At step 406, the process 400 can include receiving a signal from one or more sensors. The signal service 333 can receive a signal from the one or more sensors 309. The signal can be transmitted from each of the one or more sensors 309 over a communication channel, such as a USB connection, an I2C connection, a GPIO connection, a network connection, an RS485 connection, an RS232 connection, a wireless connection, or other communication technology. The received signal or data extracted and/or generated therefrom can be stored in the data store 339 as the signal data 342. The signal service 333 can receive the signal and generate data corresponding to the measured values therefrom. The received signal can be one or more measurement associated with the fluid (e.g., the liquid and/or the bubbles). The received signal can be a signal corresponding to or correlated to a composition to the fluid in the conduit. The received signal can be a continuous signal or a discrete signal (e.g., an individual data point for a single point in time). The signal service 333 can plot the received signal on a user interface. For example, the received signal can be plotted as a function of time (e.g., if the signal was plotted on a graph, the X axis would be time). For example, the received signal can be plotted as a function of the reservoir capacity. The reservoir capacity can be expressed as a percent or volume of liquid dispensed or remaining in the reservoir. The sensors can be any sensor capable of measuring the flow rate of the liquid. The sensors can be capacitive sensors, such as capacitive sense pads or capacitive touch pads.

If the sensors are capacitive sense pads, the sensors can measure the relative permittivity (e.g., dielectric constant, $\varepsilon$) of the fluid (e.g., the liquid and any air bubbles in the liquid). As will be understood by one having ordinary skill in the art, the relative permittivity of water or a water-based solution is higher than the relative permittivity of air. For example, the liquid can be water or a water-based solution (e.g., a water-based concentrate containing sugar, salt, and other flavorings). In one embodiment, the liquid can be oil or an oil-based solution. If there are no air bubbles in the liquid, the measured relative permittivity of the fluid will be approximately the relative permittivity of water. If there is a low concentration of air bubbles in the liquid (e.g., a low ratio of air bubbles to liquid), the measured relative permittivity of the fluid will be between the relative permittivity of water and air. If there is a high concentration of air bubbles in the liquid (e.g., a high ratio of air bubbles to liquid), the measure relative permittivity of the fluid will be close to or approximately the relative permittivity of air. Thus, the measured relative permittivity can be inversely proportional to the concentration of air bubbles in the liquid. As discussed with reference to FIGS. 1A and 1B, the concentration of air bubbles in the liquid can be inversely proportional to the flow rate of the liquid. A high concentration of air bubbles in the liquid corresponds to a low liquid flow rate. A low concentration of air bubbles in the liquid corresponds to a high liquid flow rate. Thus, the measured relative permittivity of the fluid can be proportional to the flow rate of the liquid. The received signal can be the relative permittivity of the fluid measured by the sensors. The received signal can indicate changes to the flow rate of the liquid as the liquid leaves the reservoir. For example, the received signal can indicate a decrease in the flow rate of the liquid due to a high concentration of bubbles.

At 409, the process 400 can include calculating a value based on the received signal. The signal service 333 can calculate the value based on the received signal. The calculated value can be stored in the data store 339 as the signal data 342. As will be understood and appreciated, the received signal can include noise (e.g., high frequency dips or fluctuations) caused by the bubbles. Noise can obfuscate changes in the received signal. Calculating a value based on the received signal can amplify changes in the received signal. Since the calculated value can amplify changes in the received signal, the calculated value can indicate a high concentration of bubbles in the liquid and a decrease liquid flow rate. The calculated value can indicate that the reservoir is low. The value can be a moving average. The moving average can use any appropriate number of points (e.g., 3-points, 4-points, 5-points).

The value can be a noise-to-signal ratio. The noise-to-signal ratio can amplify any changes in the received signal by several magnitudes (e.g., amplify changes in the received signal by 100% to 1000%). In one embodiment, the noise-to-signal ratio can be calculated as follows:

$$NSR = \frac{\sigma^2}{\mu^2}$$

where NSR can be the noise-to-signal ratio, σ can be the rolling standard deviation, and μ can be the rolling average. According to another embodiment, the noise-to-signal ratio can be the rolling standard deviation. For both the rolling standard deviation and the rolling average, the sampling window (e.g., range of data used for the calculations) can be any appropriate range, such as a period of time (e.g., 5 minutes, 30 minutes, 1 hour, 24 hours), reservoir capacity (e.g., a volume or percentage of liquid dispensed or remaining), volume of liquid (e.g., the volume of liquid between the sensors and the destination), or over the entire life of the reservoir.

The value can be a rolling average. The rolling average of the signal can be used to estimate the flow rate. The rolling average can be calculated as follows:

$$FSP = \frac{1}{k} \sum_{i=n-k+1}^{n} \frac{s_1 + s_2}{2}$$

where FSP can be the rolling average, k can be a period of time (e.g., measured in seconds, minutes, hours), n can be a summation index, i can be can be an iteration, $s_1$ and $s_2$ can be the received signals from at least two sensors (e.g., where $s_1$ can be a measurement from a first sensor and $s_2$ can be a measurement from a second sensor). The rolling average can be used to calculate an estimated flow rate as follows:

$$FR = \frac{FSP - LWM}{HWM - LWM}$$

where FR can be the estimated flow rate expressed as a percentage of a maximum flow rate (e.g., a relative flow rate), FSP can be the rolling average, LWM (e.g., low water mark) can be the lowest value for the rolling average, and HWM (e.g., high water mark) can be the highest value for the rolling average. As the rolling average is calculated, the low water mark and the high water mark can be saved as the signal data 342. As the low water mark and the high water mark changes, the saved low water mark and the high water mark can be updated. The low water mark and the high water mark can be tracked by an algorithm.

At 412, the process 400 can include determining whether the calculated value exceeds a first threshold. The signal service 333 can determine whether the calculated value exceeds a first threshold. If the calculated value exceeds the first threshold, the flow rate of the liquid can be decreasing due to a high concentration of bubbles in the liquid. If the calculated value exceeds the first threshold, the reservoir can be low (e.g., the volume of liquid in the reservoir can be low compared to the total capacity of the reservoir).

The calculated value exceeding the first threshold can trigger an action. For example, if the calculated value exceeds the first threshold, the triggered action can include allowing only a certain number of beverages to be dispensed before requiring the reservoir to be replaced. As an example, if the calculated value exceeds the first threshold, the triggered action can include increasing the liquid flow rate by a percentage via the pump (e.g., 1% to 100%). For example, if the calculated value exceeds the first threshold, the flow rate of the liquid can be decreasing due to a high concentration of bubbles and increasing the liquid flow rate via the pump can compensate for the decreased flow rate. The first threshold can represent a tolerable or acceptable decrease in the flow rate. For example, if the calculated value does not exceed the first threshold, the decrease in the flow rate represented by the calculated value can be tolerable or acceptable. As an example, if the calculated value does exceed the first threshold, the decrease in the flow rate represented by the calculated value can be an intolerable or unacceptable decrease in the flow rate. In this example, if the calculated value does exceed the first threshold, the triggered action can include increasing the liquid flow rate by a percentage based on the calculated value. For example, if the calculated value indicates a 5% decrease in the liquid flow rate, the triggered action can include increasing the liquid flow rate by 5% to compensate for the decrease.

The first threshold can be any value necessary to trigger an action. The first threshold can be a statistically significant value (e.g., moving average, rolling average, estimated flow rate, noise-to-signal ratio). The first threshold can be received as an input. The first threshold can be calibrated based on the liquid flow rate. The first threshold can be determined based on the historical data 348 associated with previous flow rates (e.g., the flow rates for previously used reservoirs). The first threshold can be saved as the signal data 342 in the data store 339.

At 415, the process 400 can include performing a remedial action. The control service 330 or the communication service 336 can perform a remedial action. For example, performing a remedial action can include the control service 330 or the communication service 336 transmitting a command to the pump 306. The command transmitted to the pump can depend on the received signal, the calculated value, the first threshold, or the triggered action. For example, the command can instruct the pump to increase the liquid flow rate by a predefined percentage (e.g., 1% to 100%). For example, the command can instruct the pump to increase the liquid flow rate based on the calculated value. For example, if the calculated value indicates a 5% decrease in the liquid flow rate, the command can instruct the pump to increase the liquid flow rate by 5% to compensate for the decrease. The command can cause the pump to adjust the flow rate to compensate to the decreased flow rate due to the high concentration of bubbles. The command can cause the pump to maintain a consistent liquid flow rate during the life of the reservoir (e.g., from the time the reservoir is installed until the reservoir is empty). The command can adjust the liquid flow rate such that the standard volume of liquid is dispensed each time a beverage is dispensed. In some embodiments, the control service 330 or the communication service 336 can continuously monitor the flow rate and iteratively send commands to increase or decrease the liquid flow rate. For example, commands can continually increase or decrease the liquid flow rate in real time (e.g., the commands can continually increase the liquid flow rate without triggering any additional thresholds). In some embodiments, the system operates as a closed loop system with continual adjustments over time. The command can instruct the pump to decrease the liquid flow rate based on a received input. The command can modify properties of pulse width modulation of the pump. The remedial action can include transmitting an order for a new reservoir.

At 418, the process 400 can include generating a first notification associated with the first threshold. The communication service 336 can generate a first notification associated with the first threshold. The first notification can include a notification that the reservoir is low. The first notification can include a notification to replace the reservoir or order a new reservoir. The first notification can include a notification that the device requires maintenance. The communication service 336 can transmit the first notification to the system service 360 or the computing device 315. The first notification can be displayed on the display screen 324. The first notification can be stored as the device data 345 in the data store 339.

At 421, the process 400 can include determining whether the calculated value exceeds a second threshold. The signal service 333 can determine whether the calculated value exceeds a second threshold. If the calculated value exceeds the second threshold, the flow rate of the liquid can be decreasing due to a high concentration of bubbles in the liquid or a high air to liquid ratio. If the calculated value exceeds the second threshold, the reservoir can be empty or close to empty (e.g., all or most of the liquid in the reservoir has been depleted).

The calculated value exceeding the second threshold can trigger an action. For example, if the calculated value exceeds the second threshold, the triggered action can include allowing only a certain number of beverages to be dispensed before requiring the reservoir to be replaced. As an example, if the calculated value exceeds the second threshold, the triggered action can include no longer dispensing beverages and requiring the reservoir to be replaced. The triggered action can include transmitting an order for a new reservoir. As an example, if the calculated value exceeds the second threshold, the triggered action can include increasing the liquid flow rate by a percentage via the pump (e.g., 1% to 100%). For example, if the calculated value exceeds the second threshold, the flow rate of the liquid can be decreasing due to a high concentration of bubbles and increasing the liquid flow rate via the pump can compensate for the decreased flow rate.

The second threshold can be any value necessary to trigger an action. The second threshold can be a statistically significant value (e.g., moving average, rolling average, estimated flow rate, noise-to-signal ratio). The second threshold can be received as an input. The second threshold can be calibrated based on the liquid flow rate. The second threshold can be determined based on the historical data 348 associated with previous flow rates (e.g., the flow rates for previously used reservoirs). The second threshold can be saved as the signal data 342 in the data store 339.

At 418, the process 400 can include generating a second notification associated with the second threshold. The communication service 336 can generate a second notification associated with the first threshold. The second notification can include a notification that the reservoir is empty and must be replaced before the machine can dispense beverages. The second notification can include a notification to replace the reservoir or order a new reservoir. The second notification can include transmitting an order for a new reservoir. The communication service 336 can transmit the second notification to the system service 360 or the computing device 315. The second notification can be displayed on the display screen 324. The second notification can be stored as the device data 345 in the data store 339.

Figure 5:
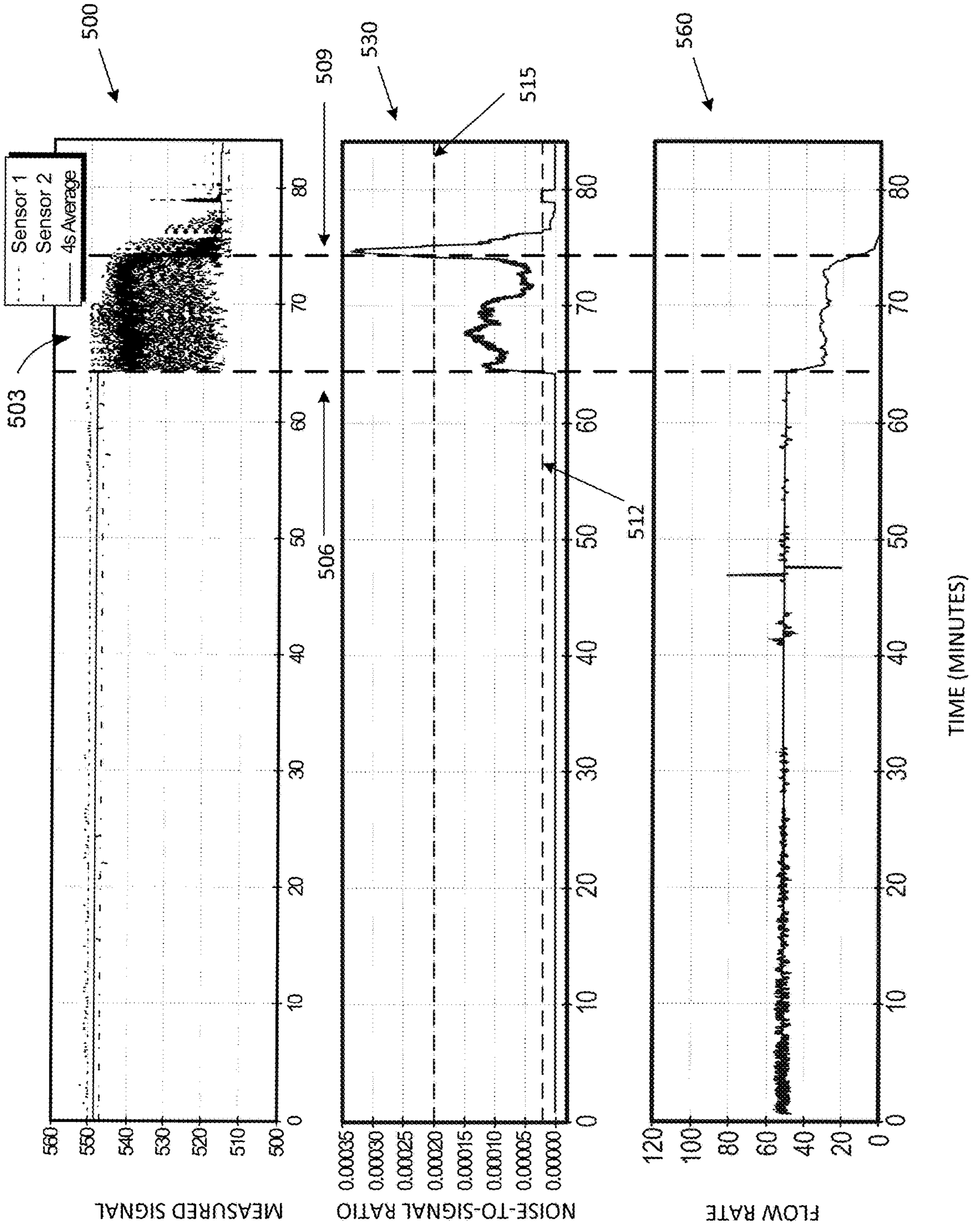
FIG. 5 illustrates exemplary signal graphs according to various embodiments of the present disclosure.

Referring now to FIG. 5, exemplary graphs 500, 530, and 560 are shown according to various embodiments of the present disclosure. As will be understood and appreciated, the exemplary graphs 500, 530, and 560 merely represent sample data from an exemplary liquid flow rate sensor system and merely represent one approach or embodiment of the present system. The graphs 500, 530, and 560 can include an X axis measuring time in minutes. The graph 500 can include a Y axis showing a measured signal. As an example, the measured signal can be a measured relative permittivity of the fluid in a conduit or channel. The graph 500 can show measurements from two sensors, sensor 1 (e.g., shown as a dotted line on the graph 500) and sensor 2 (e.g., shown as a dash dot dot line on the graph 500) over time. The graph 500 can include an average measurement (e.g., shown as the solid line on the graph 500), which can show the average measurement from sensor 1 and sensor 2. The average measurement can be a 4-point moving average. The graph 500 can include the noise section 503 beginning at the time marked by the line 506 (e.g., the vertical dashed line at approximately 64 minutes) and ending at the time marked by the line 509 (e.g., the vertical dashed line at approximately 74 minutes). The noise can obfuscate changes to the signal measured by sensor 1 and sensor 2. As will be understood and appreciated, the noise can be caused by an increased concentration of air bubbles in the liquid.

The graph 530 can include a Y axis showing a noise-to-signal ratio based on the measured signal shown in graph 500. The noise-to-signal ratio can amplify any changes in the received signal by several magnitudes (e.g., amplify changes in the received signal by 100% to 1000%). At the line 506, the noise-to-signal ratio increases due to the noise shown by the noise section 503 in the graph 500. At line 509, the noise-to-signal ratio spikes due to the noise shown by the noise section 503 in the graph 500. The noise-to-signal ratio shown in the graph 530 can be used to identify one or more thresholds (e.g., the first threshold discussed at step 412 in FIG. 4 and the second threshold discussed at step 421 in FIG. 4). For example, the thresholds can be determined based on an increase in the noise-to-signal ratio. For example, the first threshold can be set based on the signal-to-noise ratio at the time indicated by the line 506. As an example, the first threshold can be shown by the line 512 (e.g., a horizontal dashed line on the graph 530). For example, when the noise-to-signal ratio exceeds the line 512, the liquid flow rate can be increased via the pump by a predefined percentage. For example, the second threshold can be set based on the signal-to-noise ratio at the time indicated by the line 509. As an example, the second threshold can be shown by the line 515 (e.g., a horizontal dashed line on the graph 530). For example, when the noise-to-signal ratio exceeds the line 515, the dispensing device can stop dispensing beverages and can require the reservoir to be replaced before dispensing any beverages.

The graph 560 can include a Y axis showing the flow rate of the liquid. At the line 506, the flow rate can decrease due to the concentration of air bubbles in the liquid. The noise shown by the noise section 503 in the graph 500, the increase in the noise-to-signal ratio shown in the graph 530, and the decrease in the flow rate shown in the graph 560 can indicate that the reservoir in the dispensing device is low. At the line 509, the flow rate can further decrease to near zero due to the reservoir being empty. The end of the noise section 503 in the graph 500, the spike in the noise-to-signal ratio shown the graph 530, and the decrease in the flow rate shown in the graph 560 can indicate that the reservoir in the dispensing device is empty and needs to be replaced.

Figure 6:
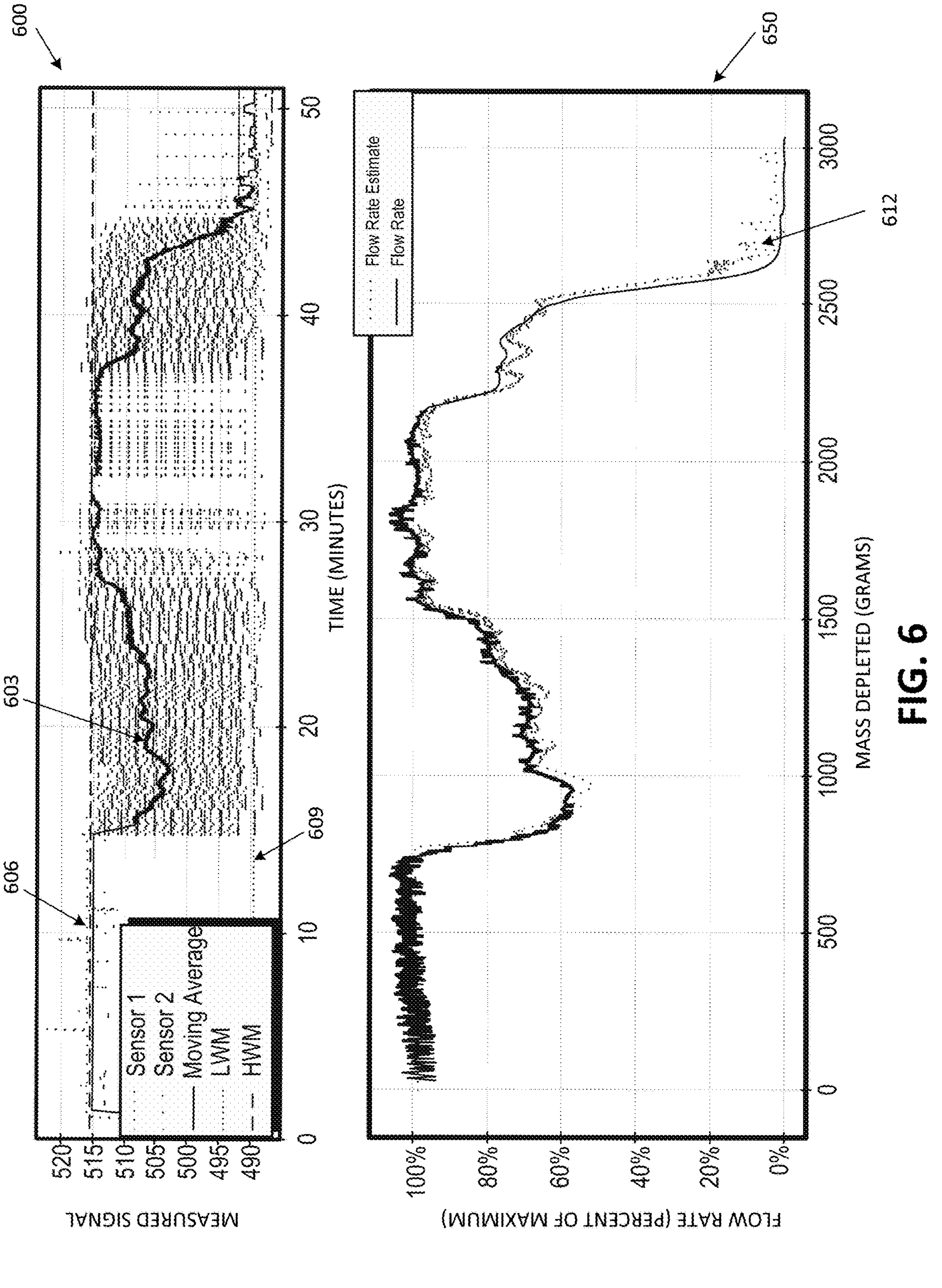
FIG. 6 illustrates exemplary signal graphs according to various embodiments of the present disclosure.

Referring now to FIG. 6, exemplary graphs 600 and 650 are shown according to various embodiments of the present disclosure. As will be understood and appreciated, the exemplary graphs 600 and 650 merely represent sample data from an exemplary liquid flow rate sensor system and merely represent one approach or embodiment of the present system. The graph 600 can include an X axis measuring time in minutes. The graph 500 can include a Y axis showing a measured signal. As an example, the measured signal can be a measured relative permittivity of the fluid in a conduit or channel. The graph 600 can show measurements from two sensors, sensor 1 (e.g., shown as a dotted line on the graph 600) and sensor 2 (e.g., shown as a dotted line on the graph 600) over time. The graph 600 can include an average measurement shown as line 603 (e.g., shown as the solid line on the graph 600), which can show the average measurement from sensor 1 and sensor 2. The average measurement can be a rolling average. The high water mark of the rolling average can be marked by the line 606 (e.g., shown as the dashed line at approximately 515 units). The low water mark of the rolling average can be marked by the line 609 (e.g., shown as the dotted line at approximately 490 units).

The rolling average can be used to calculate an estimated flow rate as shown in graph 650. The graph 650 can include an X axis measuring mass depleted from the reservoir in grams (e.g., liquid depleted from the reservoir in grams). The graph 650 can include a Y axis showing flow rate as a percentage of a maximum flow rate (e.g., a relative flow rate). The estimated flow rate can be calculated by dividing the difference between the rolling average and the low water mark by the difference between the high water mark and low water mark. The estimated flow rate can be shown as line 612 (e.g., shown as the dotted line on graph 650). The line 612 can mirror the line 603 (e.g., the relative flow rate can closely correlate to the rolling average).

The estimated flow rate shown in the graph 650 can be used to identify one or more thresholds (e.g., the first threshold discussed at step 412 in FIG. 4 and the second threshold discussed at step 421 in FIG. 4). For example, the thresholds can be determined based on a decrease in the estimated flow rate. For example, the first threshold can be a tolerable or acceptable decrease in the estimated flow rate. For example, if the estimated flow rate decreases by an amount that exceeds the first threshold, the decrease can be unacceptable. If the estimated flow rate decreases by an amount that exceeds the first threshold, the flow rate can be increased by a percentage via the pump. For example, the flow rate can be increased by a percentage corresponding to the decrease in the flow rate.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein. While thresholds are discussed herein as being met when the threshold is exceeded, the system may determine a threshold is met when a value meets or exceeds the threshold.

Clause 1. A system, comprising: at least one pump being configured to control a flow rate through a channel; at least one sensor adjacent to the channel; and at least one computing device in communication with the at least one sensor and operatively coupled to the at least one pump, the at least one computing device being configured to: receive at least one signal from the at least one sensor, wherein the at least one signal corresponds to a measurement associated with fluid in the channel; calculate a fluid value based on the at least one signal; determine that the fluid value exceeds a predefined threshold; and perform a remedial action in response to the fluid value exceeding the predefined threshold.

Clause 2. The system of clause 1 or any other clause herein, wherein the remedial action comprises the at least one computing device being further configured to transmit a command to the at least one pump to adjust the flow rate.

Clause 3. The system of clause 2 or any other clause herein, wherein the at least one computing device is further configured to detect a change in the at least one signal indicating a change in a ratio of air to liquid in the fluid and the command increases the flow rate.

Clause 4. The system of clause 3 or any other clause herein, wherein the ratio of air to liquid changes based on a quantity of bubbles in the fluid increasing.

Clause 5. The system of clause 2 or any other clause herein, wherein the command is configured to modify properties of pulse width modulations for the pump.

Clause 6. The system of clause 1 or any other clause herein, wherein the remedial action comprises the at least one computing device being further configured to generate a notification to replace at least one reservoir coupled to the channel.

Clause 7. The system of clause 1 or any other clause herein, wherein the at least one sensor is a capacitive sensor.

Clause 8. A method, comprising: receiving, via one of one or more computing devices, at least one signal from at least one sensor, wherein the at least one signal corresponds to a measurement associated with fluid in a channel; calculating, via one of the one or more computing devices, a fluid value based on the at least one signal; determining, via one of the one or more computing devices, that the fluid value exceeds a predefined threshold; and performing, via one of the one or more computing devices, a remedial action in response to the fluid value exceeding the predefined threshold.

Clause 9. The method of clause 8 or any other clause herein, further comprising controlling, via at least one pump, a flow rate of a liquid through the channel.

Clause 10. The method of clause 8 or any other clause herein, further comprising: determining, via one of the one or more computing devices, that the fluid value exceeds a second threshold; and in response to determining that the fluid value exceeds the second threshold, generating, via one of the one or more computing devices, a notification to replace a reservoir coupled to the channel.

Clause 11. The method of clause 8 or any other clause herein, further comprising generating, via one of the one or more computing devices, a notification that a reservoir is low based on the fluid value.

Clause 12. The method of clause 8 or any other clause herein, further comprising transmitting, via one of the one or more computing devices, an order for at least one new reservoir.

Clause 13. The method of clause 8 or any other clause herein, wherein the fluid value is calculated using a rolling average of the at least one signal.

Clause 14. The method of clause 8 or any other clause herein, wherein performing the remedial action comprises transmitting a command to at least one pump to increase a flow rate based on the fluid value.

Clause 15. The method of clause 14 or any other clause herein, wherein the command causes the at least one pump to increase the flow rate to be a consistent flow rate over time.

Clause 16. A non-transitory computer-readable medium embodying a program, that when executed by a computing device, causes the computing device to: receive at least one signal from at least one sensor, wherein the at least one signal corresponds to a measurement associated with fluid in a channel; calculate a fluid value based on the at least one signal; determine that the fluid value exceeds a predefined threshold; and perform a remedial action in response to the fluid value exceeding the predefined threshold.

Clause 17. The non-transitory computer-readable medium of clause 16 or any other clause herein, wherein the program further causes the computing device to control, via at least one pump, a flow rate of a liquid from a reservoir.

Clause 18. The non-transitory computer-readable medium of clause 16 or any other clause herein, wherein the program further causes the computing device to determine the predefined threshold based on a calibration.

Clause 19. The non-transitory computer-readable medium of clause 16 or any other clause herein, wherein the program further causes the computing device to determine the predefined threshold based on historical data associated with one or more historical measurements.

Clause 20. The non-transitory computer-readable medium of clause 16 or any other clause herein, wherein the fluid value is a noise to signal ratio.

Clause 21. The non-transitory computer-readable medium of clause 16 or any other clause herein, wherein the at least one signal from the at least one sensor comprises a plurality of high frequency dips.

These and other aspects, features, and benefits of the claims will become apparent from the detailed written description of the aforementioned aspects taken in conjunction with the accompanying drawings, although variations and modifications thereto may be effected without departing from the spirit and scope of the novel concepts of the disclosure.

What is claimed is:

1. A system, comprising:

at least one pump being configured to control a flow rate through a channel;

at least one capacitive sensor outside the channel and adjacent to an external surface of the channel and configured to sense a relative permittivity of fluid in the channel through the external surface; and at least one computing device comprising a processor and in communication with the at least one capacitive sensor and operatively coupled to the at least one pump, the at least one computing device being configured to:

receive at least one signal from the at least one capacitive sensor, wherein the at least one signal corresponds to a measurement of a ratio of air to liquid in fluid flowing inside of the channel based on the relative permittivity of the fluid;

calculate a fluid value based on the at least one signal;

determine that the fluid value exceeds a predefined threshold; and perform a remedial action in response to the fluid value exceeding the predefined threshold.

2. The system of claim 1, wherein the remedial action comprises the at least one computing device being further configured to transmit a command to the at least one pump to adjust the flow rate.

3. The system of claim 2, wherein the at least one computing device is further configured to detect a change in the at least one signal indicating a change in the ratio of air to liquid in the fluid and the command increases the flow rate.

4. The system of claim 3, wherein the ratio of air to liquid changes based on a quantity of bubbles in the fluid increasing.

5. The system of claim 2, wherein the command is configured to modify properties of pulse width modulations for the pump.

6. The system of claim 1, wherein the remedial action comprises the at least one computing device being further configured to generate a notification to replace at least one reservoir coupled to the channel.

7. A method, comprising:

receiving, via one of one or more computing devices, at least one signal from at least one capacitive sensor positioned outside the channel and adjacent to an external surface of a channel to sense a relative permittivity of fluid in the channel through the external surface, wherein the at least one signal corresponds to a measurement of a ratio of air to liquid in fluid flowing inside of the channel based on the relative permittivity of the fluid;

calculating, via one of the one or more computing devices, a fluid value based on the at least one signal;

determining, via one of the one or more computing devices, that the fluid value exceeds a predefined threshold; and performing, via one of the one or more computing devices, a remedial action in response to the fluid value exceeding the predefined threshold.

8. The method of claim 7, further comprising controlling, via at least one pump, a flow rate of a liquid through the channel.

9. The method of claim 7, further comprising:

determining, via one of the one or more computing devices, that the fluid value exceeds a second threshold; and in response to determining that the fluid value exceeds the second threshold, generating, via one of the one or more computing devices, a notification to replace a reservoir coupled to the channel.

10. The method of claim 7, further comprising generating, via one of the one or more computing devices, a notification that a reservoir is low based on the fluid value.

11. The method of claim 7, further comprising transmitting, via one of the one or more computing devices, an order for at least one new reservoir.

12. The method of claim 7, wherein the fluid value is calculated using a rolling average of the at least one signal.

13. The method of claim 7, wherein performing the remedial action comprises transmitting a command to at least one pump to increase a flow rate based on the fluid value.

14. The method of claim 13, wherein the command causes the at least one pump to increase the flow rate to be a consistent flow rate over time.

15. A non-transitory computer-readable medium embodying a program, that when executed by a computing device, causes the computing device to:

receive at least one signal from at least one capacitive sensor positioned outside the channel and adjacent to an external surface of a channel to sense a relative permittivity of fluid in the channel through the external surface, wherein the at least one signal corresponds to a measurement of a ratio of air to liquid in fluid flowing inside of the channel based on the relative permittivity of the fluid;

calculate a fluid value based on the at least one signal;

determine that the fluid value exceeds a predefined threshold; and perform a remedial action in response to the fluid value exceeding the predefined threshold.

16. The non-transitory computer-readable medium of claim 15, wherein the program further causes the computing device to control, via at least one pump, a flow rate of a liquid from a reservoir.

17. The non-transitory computer-readable medium of claim 15, wherein the program further causes the computing device to determine the predefined threshold based on a calibration.

18. The non-transitory computer-readable medium of claim 15, wherein the program further causes the computing device to determine the predefined threshold based on historical data associated with one or more historical measurements.

19. The non-transitory computer-readable medium of claim 15, wherein the fluid value is a noise to signal ratio.

20. The non-transitory computer-readable medium of claim 15, wherein the at least one signal from the at least one capacitive sensor comprises a plurality of high frequency dips.

* * * * *